2,877,104

ABRASIVE MATERIAL AND METHOD OF MAKING SAME

Norman P. Robie, Hamburg, N. Y., assignor to Electro Refractories & Abrasives Corporation, Buffalo, N. Y.

No Drawing. Application July 5, 1955
Serial No. 520,156

9 Claims. (Cl. 51—308)

This invention relates to abrasive material in which the individual grits or particles are composed of a mixture of fused oxidic materials and to a method of making the same.

It is well known in the abrasive art to make abrasive particles by fusing and crushing high purity aluminum oxide, zirconium oxide or the like, making sure that possible other contaminating oxides are either removed prior to fusion or are reduced to metal form during fusion by adding carbon to so reduce them and thereafter removing the metal so formed.

Other abrasives have been made by adding to the material to be fused minor amounts of such oxides as beryllium, vanadium or chromium which modify the crystal structure of the main oxides. Grinding wheels have also been made by mixing together separate particles of various oxides. These approaches all differ from the present invention however, in that I make my abrasive particles such that crystals of individual oxides are not individually distinguishable as such but rather appear to be present as a sort of solid solution in one another.

The object of my invention is to produce abrasive particles of superior grinding ability and to do so at economical costs which I find are substantially less per piece of work abraded than is the case with customary abrasives.

While my invention is very broad in its general scope, and is applicable to a wide range of compositions, I find it works out particularly well where the principal oxides are zirconia and titania present as solid solutions in one another with solutions of other oxides therein. I find it desirable that in addition to the $ZrO_2$ and $TiO_2$ there should be from 3 to 20% of other oxides present. I have not been able to determine whether these exist as solid solutions or as a magma between the main constituents. These other oxides are particularly those of silicon and iron but may include also those of other trivalent elements, such as chromium or aluminum.

The relative proportions of these various oxides may be varied over a considerable range. There appears to be a series of solid solutions between $ZrO_2$ and $TiO_2$ between about 20 and 80 weight percent of $ZrO_2$. These solutions form excellent abrasives in the entire range of mixtures containing $ZrO_2:TiO_2$ in weight percentage ratios from 8:2 to 2:8 when accompanied by a small proportion of other oxides which I shall call magma-forming oxides even though I am not sure in what form they are really present.

The proportion of magma-forming oxides, should be from 3 to 20% of the total. These should preferably include from 1 to 5% $SiO_2$ and at least an equal amount of an oxide of a trivalent metal such as Fe, Al, or Cr.

In practicing my invention, I find that I can start with ores high in $ZrO_2$ and $TiO_2$ but containing also material amounts of silica and iron oxide. For the $ZrO_2$ source, for instance, I may use baddeleyite, zirkite or zircon. For the $TiO_2$ source, ilmenite ($FeO$—$TiO_2$) is well suited and inexpensive. To remove the unwanted $SiO_2$ from zircon, etc., I may use high temperature to volatilize some of the $SiO_2$ and thereafter add the ilmenite, but this is a more costly way than to reduce most of the silica to metal with carbon and then collect the silicon as magnetic ferrosilicon. I prefer therefore to admix the $ZrO_2$ ore and the ilmenite together with the desired amount of carbon and subject the mixture to fusion in an electric arc furnace. Additional iron or iron oxide can be added (when it is desired to keep the ilmenite content low) so as to make the metallic portion of the fusion heavy.

The ratio of metallic Fe to metallic Si is 4:1 or greater in the magnetic product, but I find that my fusions are so fluid that adequate separation of the metal from the abrasive can be accomplished by gravity without requiring magnetic separation.

In adding carbon, however, I make sure that the amount used is not so great as to reduce to metal all the silica and iron oxide present since I wish to retain some of these oxides in my finished abrasive. Also a high degree of reduction removes from the melt a material amount of the oxides of Zr and Ti which I wish to retain in oxide form in my finished product. A certain amount of carbon is oxidized away during the furnacing operation, so I find that an adequate portion of unreduced oxides results when the added carbon is from 0 to 20% less than that theoretically required to reduce out the Si and Fe completely. The minor amount of the carbon which goes to reduce out Zr and Ti can be disregarded in figuring the furnace charge.

After my fused mass solidifies, I crush and screen it in the usual way and remove the metallic buttons and shot by hand-sorting or magnetic or other suitable treatment. When the abrasive is to be used to make organic bonded grinding wheels, it is less essential that all fine metallic particles be removed than when it is to go into vitrified abrasives, but excessive metallics should be avoided in any case.

The following example of the production of an abrasive in accord with my invention is cited as an illustration and not for purpose of limitation:

Example I

Fusion mixture:
  2000 lbs. 8 and finer $ZrO_2$ ore (73% $ZrO_2$—12% $SiO_2$; 3% $Fe_2O_3$—1.5% $TiO_2$)
  1100 lbs. ilmenite (57–59% $TiO_2$—31–33% $Fe_2O_3$)
  110 lbs. carbon powder These materials were premixed together and then fed to an arc furnace of the type commonly used to fuse alumina abrasives over a period of seven hours. Upon being allowed to cool, the pig was found to be a tough, black product with a specific gravity of 4.67 and having the following chemical composition:

|  | Percent |
|---|---|
| $ZrO_2$ | 57.2 |
| $TiO_2$ | 27.5 |
| $Fe_2O_3$ | 6.85 |
| $SiO_2$ | 2.96 |
| C | 0.08 |
|  | 94.57 |

Its hardness was however substantially below that of other known abrasives as shown in the following table of Knoop hardnesses under 100 gm. load:

| | |
|---|---|
| SiC | 2500 |
| Fused $Al_2O_3$ | 2000 |
| Zircon | 1340 |
| Fused alpha $ZrO_2$ | 1090–1270 |
| Baddeleyite | 880 |
| My product | 560–670 |

In order to evaluate the relative abrasive properties of my product vs. other abrasives commonly used, I made and tested a series of 16 x 2 x 6 inch snagging wheels on stainless steel slabs using 205 lbs. down-head pressure. All wheels were made using the same percent by volume of the same bond, cured in the same manner and in all I used comparable abrasive particle sizes. In such tests, the ratio of metal loss in lbs. per hour to wheel loss in cu. inches per hour may be taken as a measure of abrasive efficiency. The results for the tests in question showed:

| Material— | Ratio |
|---|---|
| Unstabilized fused $ZrO_2$ | 3.60 |
| My product above | 2.93 |
| Fused $TiO_2$—$ZrO_2$ per U. S. Pat. 2,653,107 | 2.68 |
| Equal volumes my product and select fused $Al_2O_3$ | 1.73 |
| Fused alumina alone | 0.90 |

My experience has been that this ratio for alumina wheels in general runs from 0.56 to 1.45 so that there is no question that the results above represent really superior abrasive performance. My product is not as effective as fused zirconia alone and only slightly superior to the product of U. S. Patent 2,653,107, but it is materially cheaper to produce than either, and hence per unit of cost is the most desirable of the lot.

Other fusions with varying ratios of $ZrO_2$ and $TiO_2$ show values over 2.0 over the percentage proportions of 8:2 to 2:8 of $ZrO_2$ and $TiO_2$. As noted above, I find it desirable to also have in my product some other oxides particularly those of silicon and iron.

*Example II*

The previous example was made with an ore which is higher cost than zircon sand because of its higher zirconium content. Another fusion was made with lower cost zircon sand containing about 66% $ZrO_2$, 33% $SiO_2$ and about 1% impurities including $Fe_2O_3$ and $TiO_2$. In this second example, I calculated the iron content of the charge to give a ferrosilicon with less than 80% iron. I found that with lower iron content, the ferrosilicon formed a metallic non-magnetic button at the bottom of the pig. The cleanness of separation of this button demonstrates the advantage of my abrasive in purification on account of lower specific gravity and higher fluidity of the abrasive melt as compared to purer zirconia abrasives.

The fusion mixture in this case consisted of:

1000 lbs. zircon sand
656 lbs. ilmenite
81 lbs. carbon

The abrasive formed was quite similar to that of Example I. It was a black, opaque, fused mass. It had a slightly lower $ZrO_2$ content. However, to raise the $ZrO_2$ content, all that is necessary is to decrease the proportions of the ilmenite and carbon somewhat and add a small amount of iron turnings to wash down the reduced silicon.

The abrasive of Example II when tested as above also showed a ratio of roughly 2.5, indicating excellent abrasive quality.

It should be noted that not only does the relatively low density of my abrasive facilitate the separation of metallics during fusion, but that since fewer pounds of material are required per unit of wheel volume, the cost of the wheel is reduced. The decreased weight of the wheel in comparison with straight $ZrO_2$ (density 5.43) wheels moreover adds to the safety of operation, since the force tending to burst a rotating body is proportional to its weight.

Materials generally referred to as zirconia or zirconium oxide without special purification are known to contain up to about 2% hafnium oxide. For purposes of this disclosure, materials described as zirconium ore or zirconium oxide will not have had special purification to remove hafnium.

For resin bonded abrasives, it is desirable to remove metalic particles from the material before bonding, but it is not strictly essential that such removal be complete. In the case of ceramic bonded wheels, however, it is important that no particles of metal or metal carbide be present, so that for such wheels I may subject the crushed abrasive to oxidation at red heat or above, in order to convert these undesired materials to oxides, which cause less trouble.

While my examples above are specifically on abrasives comprising mainly $ZrO_2$ and $TiO_2$, many other compositions are possible within the scope of this disclosure. In a similar manner I can make abrasives containing $TiO_2$ with one or more of the following oxides: $ZrO_2$, $Al_2O_3$, $BeO$, $Cr_2O_3$, $Fe_2O_3$, and $SiO_2$. Also, I can make abrasives containing $Cr_2O_3$ with one or more of the following oxides: $ZrO_2$, $Al_2O_3$, $BeO$, $TiO_2$, $Fe_2O_3$ and $SiO_2$. Wheels may be made with blends of these abrasives with conventional abrasives such as fused $Al_2O_3$ and silicon carbide. One advantage of products made according to the disclosed process is that refined oxides are not required and that the abrasives may be made direct from natural ores. However, it may be advantageous at times to add certain refined oxides to the mixture of ores. Also, it may at times be desirable to add metallic iron along with the iron oxide in the ores.

I have by this invention made possible the production of higher efficiency, lower cost abrasives. Having now described this invention, I declare that what I claim is:

1. A raw batch for the production of a fused abrasive consisting of ores high in zirconia and titania, the zirconia and titania being sufficient to constitute at least 80% of the final product and in a proportion to one another between 8:2 and 2:8, said ores also containing silica and iron oxide, the batch also containing carbon in an amount from 0 to 20% less than that theoretically required to reduce to metal the portion of the batch consisting of said oxides of silicon and iron.

2. A fused abrasive composed of from 80 to 97% of a mixture of zirconium and titanium oxides in a ratio to one another between 8:2 and 2:8, the residue of the abrasive consisting of magma forming oxides including from 1 to 5% of silica and at least an equal amount of a trivalent oxide, the product being such that crystals of the component oxides are not individually distinguishable.

3. The process of making an oxidic abrasive material which consists of completely fusing together a mixture of ilmenite and an ore of zirconium and an ore of one or more of the group of metals consisting of aluminum, iron, chromium and beryllium together with carbon in sufficient amount to reduce partially but incompletely to metal a portion of the oxides of iron and silicon present in said ores while leaving a sufficient quantity of said oxides unreduced to metal so that the said unreduced oxides constitute from 3 to 20% of the weight of oxidic materials remaining after fusion and thereafter cooling the mass to solidify it forming an oxidic mass in which the individual oxides are not individually distinguishable after soldification.

4. As an abrasive material, an interfused mixture composed of the oxides of titanium and zirconium in a ratio to one another between 2:8 and 8:2, together with from 3 to 20% of other magma forming oxides selected from the group consisting of silica and the oxides of the trivalent elements Fe, Cr and Al, the amount of silica being from 1 to 5% and the amount of oxide of a trivalent element being at least equal the percent of silica.

5. An abrasive material composed of an interfused mixture of the oxides of titanium and zirconium in a ratio to one another between 2:8 and 8:2 together with from 1 to 5 percent by weight of silica and from 2 to 15 percent by weight of oxide of a trivalent metal from the group consisting of Fe, Cr and Al.

6. The material of claim 4 in which the other magma forming oxides are those of silicon and iron.

7. The material of claim 4 in which the other magma forming oxides are those of silicon and aluminum.

8. The process of making an abrasive material which consists of mixing together ores consisting principally of the oxides of titanium and zirconium in a ratio to one another between 8:2 and 2:8 and containing also oxides of silicon and of trivalent metals, adding thereto carbon in such amount as to reduce to metal a portion of the oxides of silicon and trivalent metals present while leaving said oxides unreduced in sufficient quantity that the said unreduced oxides constitute from 3 to 20% of the weight of oxidic materials remaining after fusion, fusing the mixture, freezing the fused mass and separating the metallic from the non-metallic portions thereof.

9. The process of making an abrasive material which consists of making an interfused mass of oxidic materials composed of titanium and zirconium oxides in a ratio to one another between 8:2 and 2:8 containing also from 3 to 20% by weight of silica plus oxides of trivalent metals, solidifying said fused mass, crushing it to abrasive particle sizes and thereafter oxidizing the crushed material at at least red heat.

References Cited in the file of this patent
UNITED STATES PATENTS

| | | |
|---|---|---|
| 486,941 | Rossi | Nov. 29, 1892 |
| 966,815 | Farup | Aug. 9, 1910 |
| 1,001,571 | Allen | Aug. 22, 1911 |
| 1,240,490 | Saunders et al. | Sept. 18, 1917 |
| 1,240,491 | Saunders et al. | Sept. 18, 1917 |
| 2,139,516 | Norris | Dec. 6, 1938 |
| 2,169,193 | Cornstock | Aug. 8, 1939 |
| 2,280,286 | Critchett | Apr. 21, 1942 |
| 2,471,242 | Royster | May 24, 1949 |
| 2,769,699 | Polch | Nov. 6, 1956 |